United States Patent
Staudenmaier et al.

(10) Patent No.: US 11,398,050 B2
(45) Date of Patent: Jul. 26, 2022

(54) APPARATUS, METHOD AND SYSTEM FOR ADJUSTING PREDEFINED CALIBRATION DATA FOR GENERATING A PERSPECTIVE VIEW

(71) Applicant: NXP USA, Inc., Austin, TX (US)

(72) Inventors: Michael Staudenmaier, Munich (DE); Nikhil Jotwani, Pune (IN)

(73) Assignee: NXP USA, Inc., Austin, TX (US)

( * ) Notice: Subject to any disclaimer, the term of this patent is extended or adjusted under 35 U.S.C. 154(b) by 1155 days.

(21) Appl. No.: 15/386,001

(22) Filed: Dec. 21, 2016

(65) Prior Publication Data
US 2017/0236305 A1 Aug. 17, 2017

(30) Foreign Application Priority Data
Feb. 11, 2016 (EP) .................................... 16155365

(51) Int. Cl.
*G06T 7/80* (2017.01)
*G06T 7/593* (2017.01)
(Continued)

(52) U.S. Cl.
CPC .................. *G06T 7/80* (2017.01); *B60R 1/00* (2013.01); *G06T 3/4038* (2013.01); *G06T 7/521* (2017.01); *G06T 7/593* (2017.01); *G06T 7/60* (2013.01); *B60R 2300/105* (2013.01); *B60R 2300/303* (2013.01); *B60R 2300/607* (2013.01); *G06T 2207/10016* (2013.01); *G06T 2207/20021* (2013.01); *G06T 2207/20221* (2013.01); *G06T 2207/30252* (2013.01)

(58) Field of Classification Search
None
See application file for complete search history.

(56) References Cited

U.S. PATENT DOCUMENTS

| 8,823,796 B2 | 9/2014 | Shen et al. |
| 8,923,648 B2 * | 12/2014 | Kurpinski ............. G06T 3/4038 |
| | | 345/629 |

(Continued)

FOREIGN PATENT DOCUMENTS

| CN | 104276102 A | 1/2015 |
| CN | 104680505 A | 6/2015 |

(Continued)

OTHER PUBLICATIONS

Zhang et al., "A surround view camera solution for embedded systems", TI, CVPR2014 Workshop, 6 pages.
(Continued)

*Primary Examiner* — Christopher G Findley (57) ABSTRACT

The present application relates to a system for generating a surround view and a method of operating the system. A synthesizer module synthesizes an output frame from input frames in accordance with predefined calibration data. The input frames have an overlapping region imaging an overlapping field of view captured by two adjacent cameras. An adjustment module receives height level information representative of a height level in the overlapping region; selects a data record out of a set of predefined calibration data records in accordance with the height level information; and updates the predefined a part of the calibration data with the selected data record.

16 Claims, 7 Drawing Sheets

(51) Int. Cl.
  *G06T 3/40* (2006.01)
  *G06T 7/521* (2017.01)
  *B60R 1/00* (2022.01)
  *G06T 7/60* (2017.01)

(56) References Cited

U.S. PATENT DOCUMENTS

| | | | |
|---|---|---|---|
| 2009/0122140 A1 | 5/2009 | Imamura | |
| 2010/0225761 A1 | 9/2010 | Ishii | |
| 2012/0287232 A1 | 11/2012 | Natroshvili et al. | |
| 2014/0098229 A1* | 4/2014 | Lu | H04N 7/181 348/148 |
| 2014/0112597 A1* | 4/2014 | Yu | H04N 7/18 382/294 |
| 2014/0293057 A1 | 10/2014 | Wierich | |
| 2015/0049193 A1* | 2/2015 | Gupta | G03B 43/00 348/148 |
| 2015/0138312 A1 | 5/2015 | Liu et al. | |
| 2015/0139568 A1 | 5/2015 | Liu et al. | |
| 2015/0254825 A1 | 9/2015 | Zhang et al. | |
| 2015/0302561 A1 | 10/2015 | Pekkucuksen et al. | |
| 2015/0334301 A1 | 11/2015 | He et al. | |
| 2017/0309042 A1* | 10/2017 | Tanaka | B60R 1/00 |

FOREIGN PATENT DOCUMENTS

| | | |
|---|---|---|
| DE | 102015000794 A1 | 8/2015 |
| EP | 2511137 A1 | 10/2012 |
| KR | 100724134 B1 | 5/2007 |
| WO | 2015110847 A1 | 7/2015 |

OTHER PUBLICATIONS

Manjunatha, Sumukha, "Eliminating Ghost Artifacts in the Overlap Area of a Surround-View System," Feb. 2, 2015, 81 pages.

* cited by examiner

APPARATUS, METHOD AND SYSTEM FOR ADJUSTING PREDEFINED CALIBRATION DATA FOR GENERATING A PERSPECTIVE VIEW

FIELD OF THE INVENTION

The present invention relates generally to perspective view vision systems, in particular to surround view vision systems for vehicles and, more particularly, to perspective view vision systems receiving video frame streams from a plurality of exteriorly facing cameras e.g. disposed at front, rear and side surfaces of a vehicle.

BACKGROUND

Rear backup cameras and other exterior vision systems are known for use in vehicles. Such systems may display images for viewing by the driver of the vehicle that provide a view exterior of the vehicle. It is known to provide a plurality of cameras at a vehicle, such as a forward facing camera, a rearward facing camera and opposite sideward facing cameras, and to stitch together images captured by the cameras to provide a surround view including a top-down view or a bird-eye view for displaying the vehicle's surrounding to be viewed by a driver of the vehicle.

A display of the top view or any other view of the surrounding may be presented on an interactive display to the driver of the vehicle. This displayed view then enables the driver to maneuver the vehicle without turning his or her head. Such information might render millimeter precision even in rough terrain, such as off-road passages, avoiding rocks, trees, logs and other obstacles. Such information may also be particularly useful when parking.

The stitching is performed on the basis of predefined geometric mapping data obtained from a calibration process in a reference environment. The calibration process aims to provide a consistent view of the area surrounding the vehicle to the driver of the vehicle. The reference environment comprises reference pattern arranged on the ground level in particular in overlapping areas captured by two cameras. In environments with surfaces at elevated levels, the stitching based on the predefined geometric mapping data may result in a distorted representations in the view of the surrounding area.

SUMMARY

The present invention provides a system for adjusting a calibration data for generating a perspective view, a method of adjusting the calibration data and a computer readable storage medium bearing computer executable instructions for carrying out the method of adjusting the calibration data of a perspective view vision system as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

The accompanying drawings, which are incorporated herein and form a part of the specification, illustrate the present invention and, together with the description, further serve to explain the principles of the invention and to enable a person skilled in the pertinent art to make and use the invention.

DETAILED DESCRIPTION

Embodiments of the present disclosure will be described below in detail with reference to drawings. Note that the same reference numerals are used to represent identical or equivalent elements in figures, and the description thereof will not be repeated. The embodiments set forth below represent the necessary information to enable those skilled in the art to practice the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

In addition, it should be understood that embodiments of the invention may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (e.g., stored on non-transitory computer-readable medium). As such, it should be noted that a plurality of hardware and software based devices, as well as a plurality of different structural components may be utilized to implement the invention.

Figure 1:
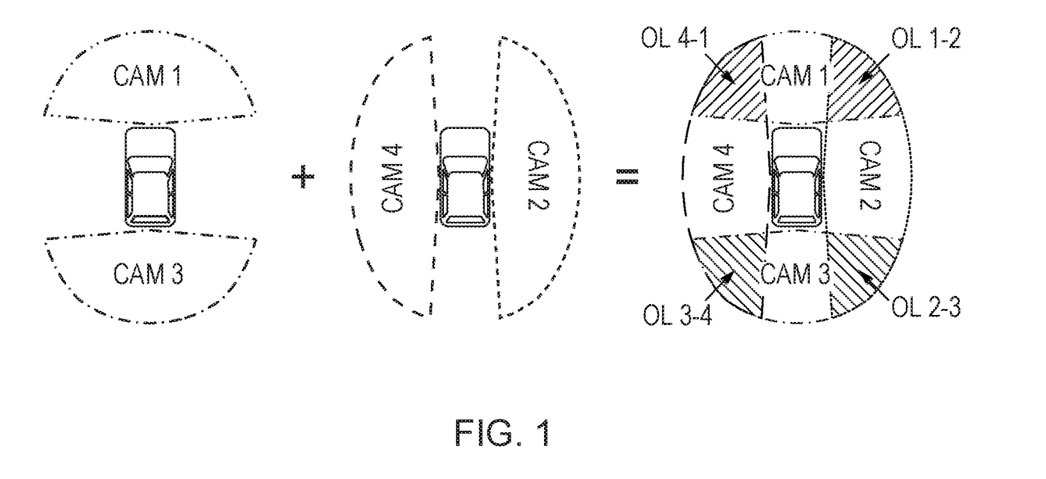
FIG. 1 schematically illustrates a block diagram of a camera arrangement of a surround view vision system a vehicle according to an example of the present invention.

FIG. 1 illustrates exemplarily a camera arrangement of a surround view vision system in a vehicle. The example camera arrangement comprises four exterior facing cameras including a forwardly facing camera CAM 1 mounted e.g. at the front section of the vehicle, a rearwardly facing camera CAM 3 mounted e.g. at the rear section of the vehicle, a sidewardly facing cameras CAM 2, CAM 4 arranged at respective right and left sides of the vehicle and mounted e.g. in the side mirrors.

The cameras capture image data from the environment, which are then converted via an electronic control unit operatively coupled to a suitable image data composed of the image data captured by two or more individual cameras. The image data can in this case be determined directly from the image information or can be calculated from the image information by the electronic control unit (ECU) applying suitable calculations. The cameras are operatively connected to the electronic control unit (ECU) of the surround view vision system, which processes the image data for generating the display image. The display image is a calculated view of the surroundings of the vehicle e.g. as seen from above, which has been calculated by the ECU from the image data received from the cameras.

As illustrated in FIG. 1, each camera CAM 1, CAM 2, CAM 3, and CAM 4 includes a wide angle lens including e.g. a fish-eye lens. Therefore, the image data captured by each camera will overlap with the image data captured by two other cameras (i.e., the camera to the left and the camera to the right of the capturing camera). Accordingly, when the image data is stitched together (described below), four stitching areas OL 1-2, OL 2-3, OL 3-4, and OL 4-1 will be created based on the overlapping image data captured by the cameras CAM 1, CAM 2, CAM 3, and CAM 4.

More generally, a surround view vision system of a vehicle operates on image data captured by a plurality of cameras such as four cameras as illustrated in FIG. 1 or more cameras, e.g. two, three or more cameras for each side and arranged on the vehicle at appropriate positions. The fields of view of the cameras at least partially overlap the fields of view of adjacent cameras of the surround view vision system.

With respect to the surround view vision system, a camera of the system may be camera with e.g. a wide angle lens, an ultra-wide angle lens or a fisheye lens. In addition, or alternatively, cameras including a rectilinear lens may be used. Those skilled in the art will understand that the angles of the lenses of the cameras used for a surround view vision system depend on the arrangement of the cameras. In order to allow for synthesizing a surround view of the whole environment around the vehicle, the lenses of the cameras of the surround view vision system are selected to create overlapping fields of view with two adjacent cameras. The overlapping field of view allows for a stitching of the individual images captured by the two adjacent cameras.

It should be noted that the surround view vision system described herein with respect to the use with vehicles may be likewise used with further objects including buildings or a larger vehicle, such as a truck, ship, boat, train, or aircraft and there may be additional or other positions for cameras chosen, such as near a rim of a roof of the object.

Moreover, it should be further noted that although the surround view vision system is described with reference to a top-down view or a bird-eye view imaging the surrounding environment around an object such as the vehicle the present application is not to be understood to be limited thereto. In examples of the present application, the surround view vision system may be used to generate perspective views including in particular perspective views based on image data captured by at least two cameras with partially overlapping fields of view. Such perspective view may include for instance a partial surround view imaging only a part of the surrounding environment around the object.

With reference to the example shown in FIG. 1, a perspective view in accordance with an example of the present application may be generated from the image data captured by the cameras CAM 1, CAM 2 and CAM 4; a perspective view in accordance with another example of the present application may be generated from the image data captured by the cameras CAM 2, CAM 3 and CAM 4; a perspective view in accordance with a further example of the present application may be generated from the image data captured by the cameras CAM 1, CAM 2 and CAM 3; and a perspective view in accordance with yet another example of the present application may be generated from the image data captured by the cameras CAM 1, CAM 3 and CAM 4.

Figure 2:
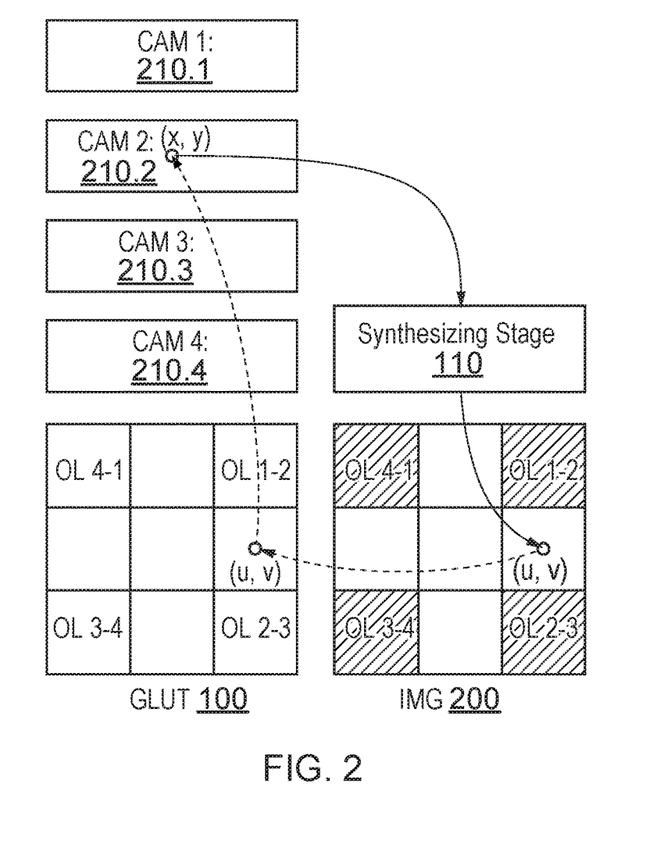
FIG. 2 schematically illustrates a block diagram of a synthesis process to compose image data captured by individual cameras according to an example of the present invention.
Figure 3:
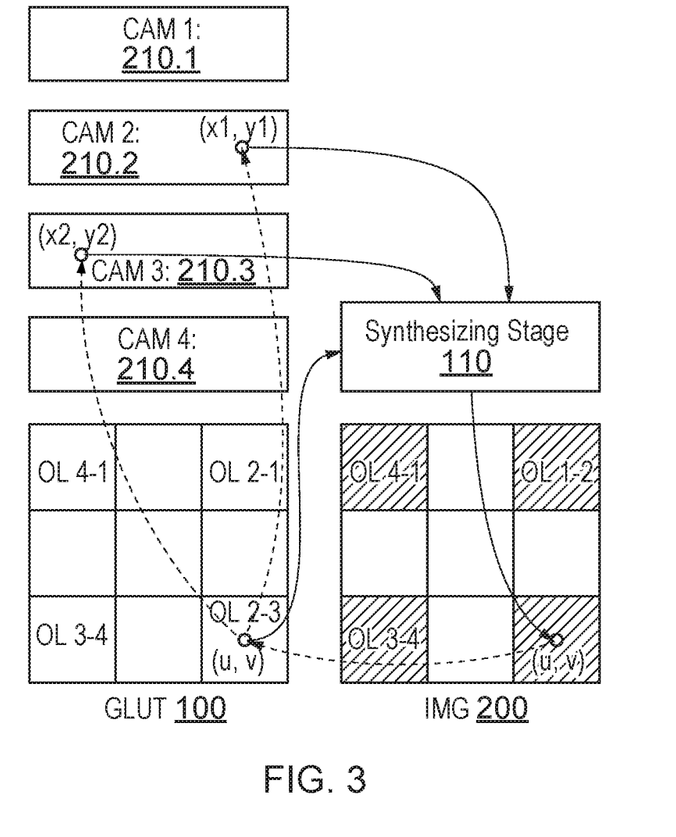
FIG. 3 schematically illustrates a block diagram of a synthesis process to compose image data captured by individual cameras according to an example of the present invention.

Referring now to FIGS. 2 and 3, the synthesis process to compose image data captured by individual cameras is illustrated schematically according to an example of the present invention. The image data is input to the synthesis process in form of time synchronized input frames. Each input frame comprises an array of pixels that correspond to a field of view around the vehicle. The number of pixels of the input frames is predefined. For example, the input frame from the camera CAM 1 includes image data corresponding to a front field of view and the input frame from the camera CAM 2 includes image data corresponding to a right side field of view.

For synthesizing an output frame 200 of the surround view, the image frames received from individual cameras to provide one or more panoramic images of the surround view from the received input frames using image stitching. Image stitching combines or "stitches" together multiple images with overlapping fields of view to produce a single panoramic image. Image stitching includes in particular blending the multiple images to combine overlapping sections and correct errors or distortions.

The synthesis is based on predefined calibration data, which is determined on the basis of inter alia the geometrical imaging properties and the spatial arrangement of the cameras. The predefined calibration data 100 may be provided in form of a table or array, which comprises an entry for each pixel of the synthesized output frame 200 of the surround view and encodes the mapping of the pixels of the input frames 210.1 to 210.4 to the pixels of the synthesized output frame 200.

The regions of the synthesized output frame 200, which are determined by stitching overlapping fields of view are schematically illustrated as hatched areas. In case of the exemplary number of four cameras, there are four overlapping fields of view OL 1-2, OL 2-3, OL 3-4, and OL 4-1.

The predefined calibration data stores different entries for non-overlapping and overlapping regions according to the parts of the synthesized output frame 200, which are determined from only one input frame from a single camera and from two input frames from two cameras by stitching, respectively.

Referring now to FIG. 2, for pixels in non-overlapping regions, the predefined calibration data 100 stores the location information (coordinates) of corresponding pixels of one of the input frames 210.1 to 210.4. For instance, the pixel with the coordinates (u,v) of the synthesized output frame 200 may be located in the non-overlapping region captured by camera CAM 2. The predefined calibration data 100 comprises for the pixel with the coordinates (u,v) an entry, which references one location with the coordinates (x,y) in the input frame 220 associated with the camera CAM 2.

Each pixel in a non-overlapping region of the synthesized output frame 200 is associated by the predefined calibration data 100 with one corresponding pixel of one of the input frames. Each entry of the predefined calibration data 100 for pixels of non-overlapping regions comprises an unambiguous reference to one location in one input frame. Each entry may at least comprise information about location coordinates within the pixel coordinate space of the input frame. Each entry may further comprise one frame identifier of one input frame.

Referring now to FIG. 3, for pixels in overlapping regions, the predefined calibration data 100 stores the location information (coordinates) of corresponding pixels of two of the input frames 210.1 to 210.4. For instance, the pixel with the coordinates (u,v) of the synthesized output frame 200 may be located in the overlapping region OL 2-3 captured by the camera CAM 2 and the camera CAM 3, respectively. The predefined calibration data 100 comprises for the pixel with the coordinates (u,v) an entry, which references one location with the coordinates (x1, y1) in the input frame 210.2 associated with the camera CAM 2 and one location with the coordinates (x2, y2) in the input frame 210.3 associated with the camera CAM 3.

Each pixel in an overlapping region of the synthesized output frame 200 is associated by the predefined calibration data 100 with two corresponding locations in two different input frames. Each entry of the predefined calibration data 100 for pixels of overlapping regions comprises an unambiguous reference to two locations each one in a different input frame. Each entry may at least comprise information about two location coordinates within the pixel coordinate space of two different input frames. Each entry may further comprise two frame identifiers of two different input frames.

At the synthesizing stage 110, one or two pixel (color) values are received for each output pixel of an output frame. The two pixel values are combined, for instance, by blending the two pixels to obtain a single pixel. The blending may be performed based on predefined blending parameters and/or blending parameters comprised by the predefined calibration data 100. The predefined calibration data 100 may comprise blending parameters for each entry (for each pixel of the output frame 200). The predefined blending parameters may comprises an alpha parameter defining the transparency of at least one of the pixels.

It should be noted that the input frames may be provided in separate frame buffers, which of which associated with an unambiguous frame identifier. Alternatively, the input frames may be provided in a common frame buffer. Each input frame may occupy a block of the frame buffer. Each pixel of an input frame may be referenced by coordinates relating to the overall dimension of the common buffer or may be referenced by coordinates relating to the dimension of the input frame and the frame identifier.

Those skilled in the art understand that the predefined calibration data comprises geometric alignment data predetermined to geometrically align the image data of the input frames in the output frame 200. A geometrical alignment considers for instance the arrangement of the cameras and the fields of view captured by the cameras. The mapping of the locations of each pixel of the synthesized output frame 200 to at least one location in at least one input frame 210.1 to 210.4 based on predefined calibration data comprises geometric alignment data the considers the geometrical alignment of the input frames 210.1 to 210.4 to allow for the synthesis of the surround view in the output frame 200.

The predefined calibration data may further comprise correction data predetermined to correct geometrically the image data of the input frames. A geometrical correction of the image data considers for instance the imaging properties of the camera and in particular the contributions/distortions of the lens to the imaging properties. For instance, a wide angle, ultra-wide angle or fisheye lens creates distortions in the image captured at the imagine plane of the camera. The mapping of the locations of each pixel of the synthesized output frame 200 to at least one pixel of one input frame 210.1 to 210.4 based on based on predefined calibration data comprises geometric alignment data considers the geometrical correction of the imaging in the input frames 210.1 to 210.4. It should be noted that the geometrical correction may be performed alternatively at a separate image correction stage (not shown) arranged upstream to the synthesizing stage 110, in particular upstream to the one or more frame buffers. The image frames provided in the one or more frame buffers may represent geometrically corrected images.

The predefined calibration data may further comprise photometric correction data predetermined to correct photometric properties of the cameras of the surround view vision system. The photometric correction data is provided to adjust the photometric properties of the cameras of the surround view vision system. The photometric correction data is provided in particular to adjust for instance the light sensitivities, the color sensitivity and/or the color balance of the cameras. It should be noted that the photometric correction may be performed alternatively at a separate image correction stage (not shown) arranged upstream to the synthesizing stage 110, in particular upstream to the one or more frame buffers.

The stitching of the overlap regions enables to create the surround view perspective shown in the synthesized output frames 200. The mapping of the coordinates of each pixel of the synthesized output frame 200 to the location coordinates in the input frames 210.1 to 210.4 for non-overlapping regions and to the location coordinates in different one of the input frames 210.1 to 210.4 for overlapping regions enables to obtain a seamless stitched surround view perspective.

Those skilled in the art will understand that the locations referenced by the predefined calibration data refer to pixel locations or to inter-pixel locations. Each input frame comprises a predefined discrete number of pixels, which are typically referred to by two-dimensional coordinates with integer values within a frame coordinates space. The image frame coordinates space is typically spanned by the pixel columns and pixel rows of the frame. Non-integer location coordinates refer to inter-pixel locations.

Figure 4:
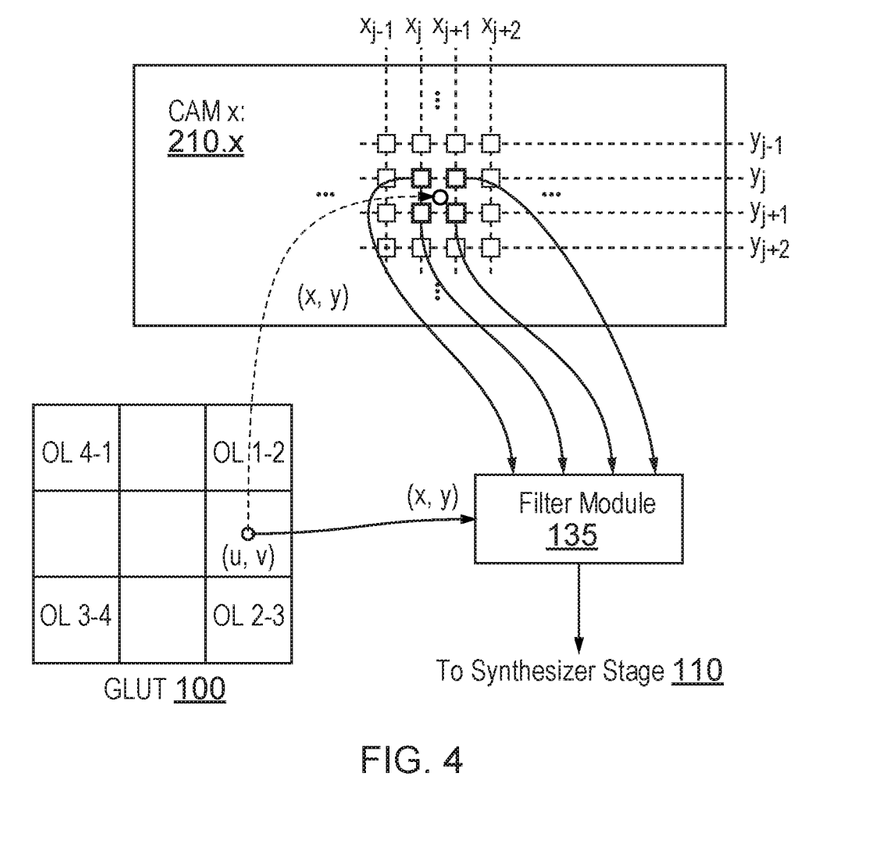
FIG. 4 schematically illustrates a block diagram of an interpolation process applied to determine pixel values at non-integer locations in the input frames according to an example of the present invention.

Referring now to FIG. 4, a block diagram of an interpolation process applied to determine pixel values at inter-pixel locations in the input frames according to an example of the present invention is schematically illustrated. The pixel values at inter-pixel locations are determined by a filtering module 135. As illustrated in FIG. 4, the predefined calibration data 100 associates the pixel coordinates (u,v) of the output frame 200 with pixel coordinates (x,y) within a frame 210.x of the camera CAM x. The pixel coordinates (x,y) are non-integer coordinates:

$x_j < x < x_{j+1}$ and
$y_j < y < y_{j+1}$, wherein $x_j = 0, \ldots, n-1$ and $y = 0, \ldots, m-1$, ($x_j$, y are integer) and wherein the input frame 210.x comprises n pixel columns and m pixel rows; the image of the input frame has a size of (n, m) pixel.

The filtering module 135 receives the location coordinates (x,y) and, if required, determines the pixel value at the requested location coordinates by applying any filtering algorithm including in particular two-dimensional spatial interpolation algorithms such as nearest neighborhood interpolation, bilinear interpolation, bicubic interpolation, trilinear interpolation, spline interpolation, Lanczos resampling, and stairstep interpolation (without limitation to the exemplary list).

The filtering module 135 is configured to determine the pixel values at inter-pixel locations on the basis of a plurality of pixel values at pixel locations in the frame. The plurality of pixel values at pixel locations are input values to the filtering algorithm performed by the filtering module 135. The determined pixel values at the requested inter-pixel location is supplied to the synthesizing stage 110.

As further exemplified in FIG. 4, the filter module 135 is arranged to apply a bilinear interpolation as filtering algorithm. The pixel value p(x,y) (P(x,y) is not shown in figure) at the location coordinates (x,y) is hence a function of four pixel values $p(x_j, y_j)$, $p(x_{j+1}, y_j)$, $p(x_j, y_{j+1})$, and $p(x_{j+1}, y_{j+1})$ at the location coordinates $(x_j, y_j)$, $(x_{j+1}, y_j)$, $(x_j, y_{j+1})$, and $(x_{j+1}, y_{j+1})$. The pixel value p(x,y) may be calculated in accordance with following approximation:

$$p(x, y) \approx [1 - x' \quad x'] \begin{bmatrix} p(x_j, y_j) & p(x_j, y_{j+1}) \\ p(x_j, y_{j+1}) & p(x_{j+1}, y_{j+1}) \end{bmatrix} \begin{bmatrix} 1 - y' \\ y \end{bmatrix},$$

wherein $x'=x-x_j$ and $y'=y-y_j$.

The filter module 135 may be part of the synthesizing stage 110.

As aforementioned, the predefined calibration data 100 is typically obtained by a calibration process in a reference environment. Such a reference environment comprises reference pattern arranged on the ground level in particular in the overlap areas captured by two cameras. In environments with surfaces at elevated levels, the stitching based on the predefined geometric mapping data may result in a distorted representations in the view of the surrounding area.

Figure 5:
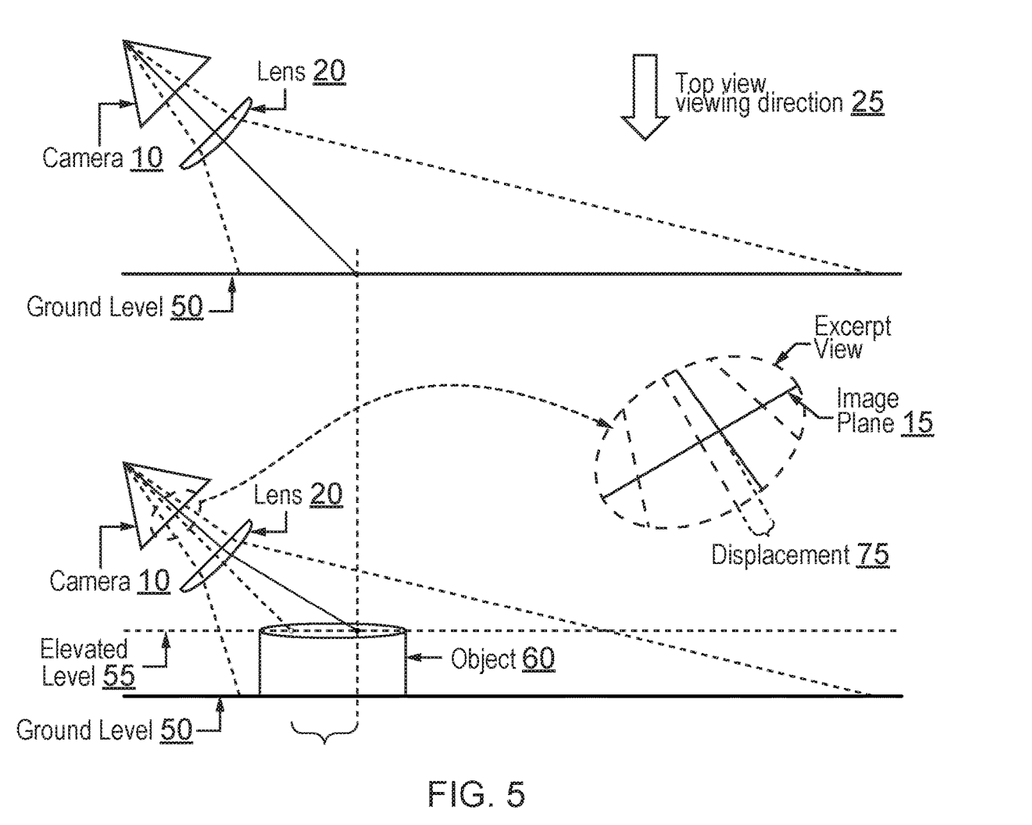
FIGS. 5 and 6 show schematic illustrations of a displacement of an imaging of an elevated surface of an object on an imaging plane in different viewing directions according to an example of the present invention.
Figure 6:
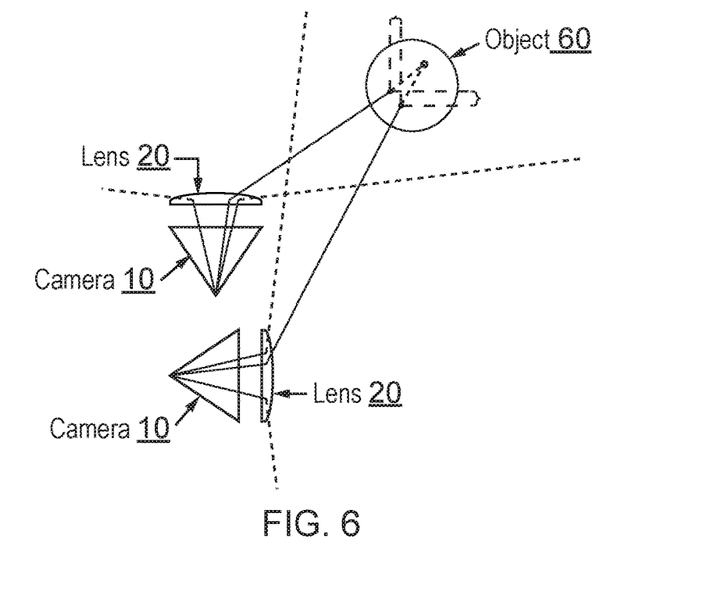

Referring now to FIGS. 5 and 6, schematic illustrations show a camera 10 with an image mapping lens 20, which maps the real world environment of the field of view on the image plane/focal plane 15 of the camera 10.

In FIG. 5, a real world environment with a flat ground at a ground level 50 as used in a calibration process to obtain the predefined geometric mapping data is schematically illustrated. In FIG. 6, a real world environment with an object 60 is schematically illustrated. As immediately understood from the schematic illustrations shown in FIGS. 5 and 6, an object 60 with a top surface at elevated level (above the ground level 50) create a displacement 75 in the image captured at the image plane 15 with respect to the top view viewing direction 25.

In case that the object 60 is located in an area captured by two cameras, it is understood that the predefined geometric mapping data do not allow to create an output frame 200 showing a seamless stitched surround view perspective. On the contrary, the stitching of the overlapping regions based on the predefined geometric mapping data creates distortions and omissions in the respective overlapping region of the output frame 200.

Figure 7:
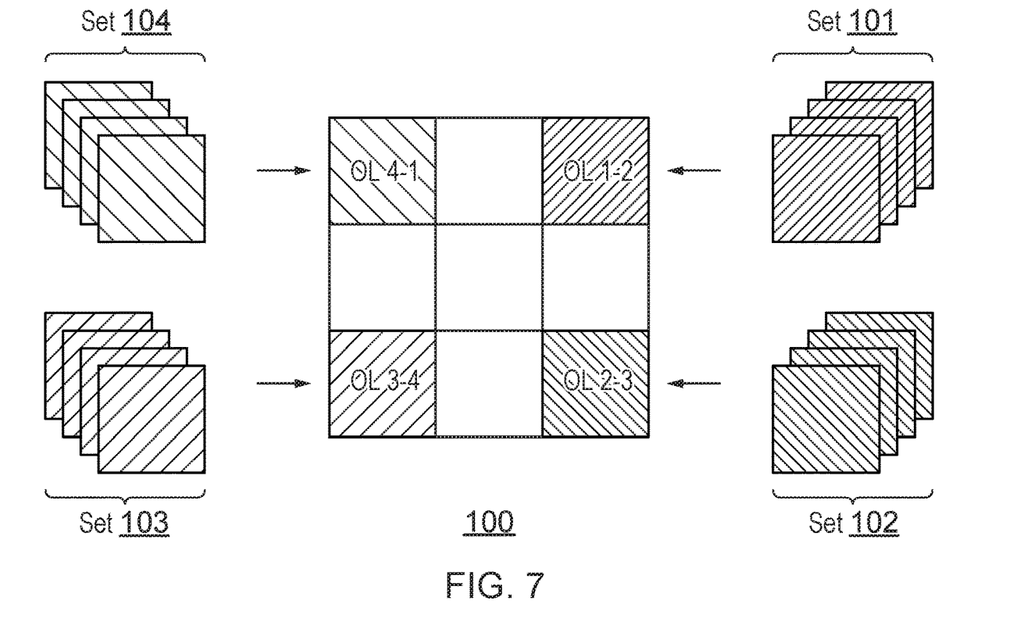
FIG. 7 schematically illustrates a predefined calibration data with overlapping regions adjustable in accordance with height levels according to an example of the present invention.

Referring now to FIG. 7, a predefined calibration data for overlapping regions which are adjustable in accordance with height levels according to an example of the present invention is schematically illustrated. In order to minimize the effects of objects having surfaces at elevated levels, a set of predefined calibration data records determined for different height levels is provided for an overlapping region. A set of predefined calibration data records is provided for each overlapping region. In case of four cameras CAM 1 to CAM 4 as exemplified in FIGS. 1 to 3, four sets of predefined calibration data records are provided each for one of the four overlapping regions OL 1-2, OL 2-3, OL 3-4, and OL 4-1.

The set 101 comprises for instance a set of calibration data records predefined for the overlapping region OL 1-2 of the camera CAM 1 and the camera CAM 2. Each data record of the set 101 is predetermined for a different height level including the ground level and one or more elevated height levels. The set 102 comprises for instance a set of calibration data records predefined for the overlapping region OL 2-3 of the camera CAM 2 and the camera CAM 3. Each data record of the set 102 is predetermined for a different height level including the ground level and one or more elevated height levels. The set 103 comprises for instance a set of calibration data records predefined for the overlapping region OL 3-4 of the camera CAM 3 and the camera CAM 4. Each data record of the set 103 is predetermined for a different height level including the ground level and one or more elevated height levels. The set 104 comprises for instance a set of calibration data records predefined for the overlapping region OL 4-1 of the camera CAM 1 and the camera CAM 4. Each data record of the set 104 is predetermined for a different height level including the ground level and one or more elevated height levels.

Hence, each data record is associated with an overlapping region and with a height level. A data record is selectable based on a height level information relating to a respective overlapping region.

Each predefined calibration data record is determined for geometric mapping at a different predefined height level. The data records of the sets comprises predefined mapping data, which is typically obtained by a calibration process in a reference environment. Such a reference environment comprises reference pattern arranged on the ground level and one or more height levels in particular in the overlap areas captured by two cameras. For each height levels a data record for a respective overlapping region is determined in the calibration process. The calibration process may be performed for instance at design time of the surround view vision system or at production time per surround view vision system.

Figure 8:
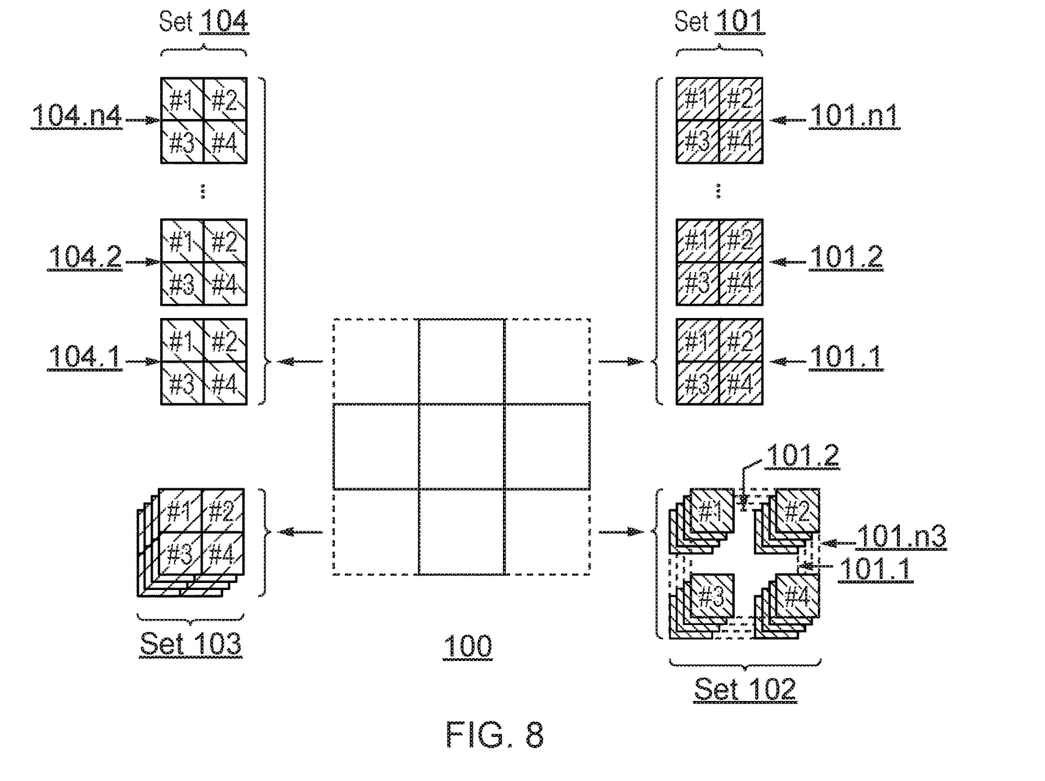
FIG. 8 schematically illustrates a predefined calibration data with overlapping regions tile-wise adjustable in accordance with height levels according to another example of the present invention.

Referring now to FIG. 8, a predefined calibration data with overlapping regions tile-wise adjustable in accordance with height levels according to another example of the present invention. In order to consider different levels of heights in an overlapping region, a set of calibration data records may comprise a number of subsets of calibration data sub-records, each sub-record provided for a sub-region of the respective overlapping region. The totality of sub-regions covers the overlapping region. Each sub-record of a subset of predefined calibration data records The records may be understood to be divided into a number of tiles (the number of tiles corresponding to the aforementioned number of subsets). The respective tiles form a set of predefined calibration data sub-records. Each data sub-record being a tile of a data record relates to a sub-region of the overlapping region and is associated with a height level.

As schematically illustrated in FIG. 8, the set 101 comprises for instance a set of n1 calibration data records 101.1 to 101.$n1$ predefined for the overlapping region OL 1-2. Each data record of the set 101 is predetermined for a different height level. Each data record further comprises tiles, e.g. the tiles #1 to #4 (four tiles for the sake of example only), each tile relates to a corresponding overlapping sub-region of the overlapping region OL 1-2. The tiles will be also referred to as data sub-records. Likewise, the set 104 comprises for instance a set of n4 calibration data records 104.1 to 104.n4 predefined for the overlapping region OL 4-1. Each data record of the set 104 is predetermined for a different height level. Each data record further comprises tiles, e.g. the tiles #1 to #4 (four tiles for the sake of example only), each tile relates to a corresponding overlapping sub-region of the overlapping region OL 4-1.

Analogously, the set 102 comprises for instance four subsets of calibration data sub-records (four subsets for the sake of example only). Each subset relates to a sub-region of the overlapping region OL 2-3. Each subset corresponds to the respective tiles comprises by the set 102 of calibration data records. Likewise, the set 103 comprises for instance four subsets of calibration data sub-records (four subsets for the sake of example only). Each subset relates to a sub-region of the overlapping region OL 3-4. Each subset corresponds to the respective tiles of the set 103 of calibration data records.

Hence, each tile or data sub-record is associated with a sub-region of an overlapping region and with a height level. A tile or data sub-record is selectable based on a height level information relating to a respective sub-region.

Figure 9:
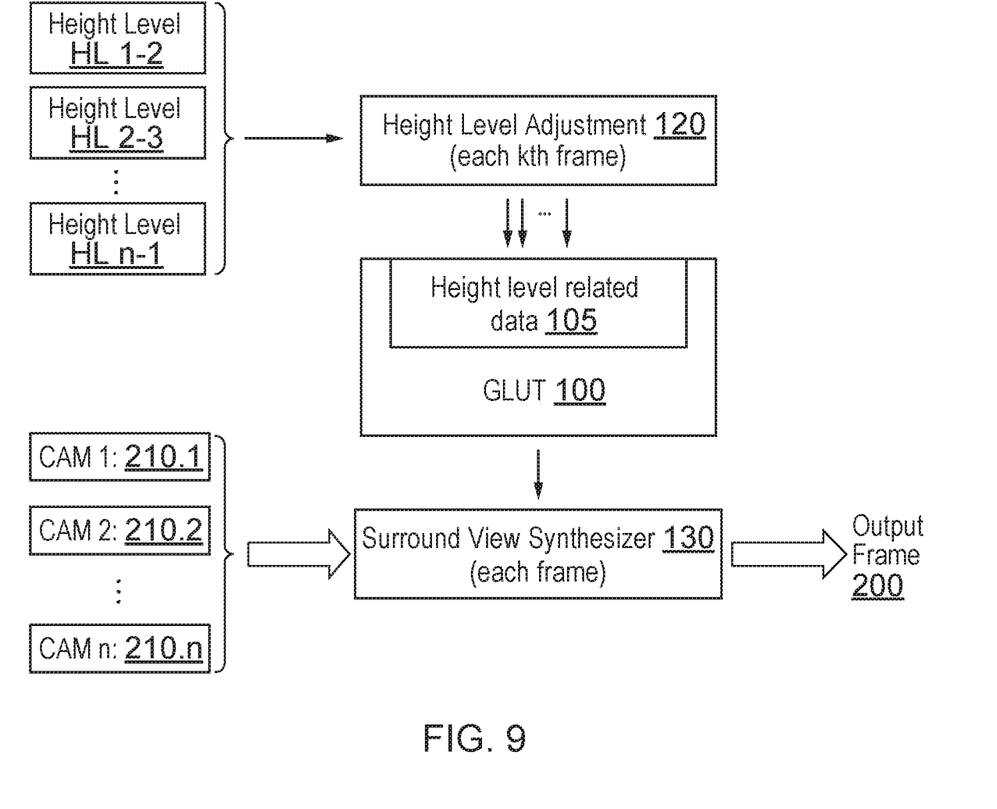
FIGS. 9 and 10 schematically illustrate block diagrams of synthesizing stages according to examples of the present invention.

Referring now to FIG. 9, a block diagram of a synthesizer stage according to an example of the present application is schematically illustrated.

The block diagram of FIG. 9 exemplifies a synthesizer stage of the synthesizer stage 110 described above with reference to FIGS. 2 and 3. The example synthesizer stage comprises a surround view synthesizer module 130. The synthesizer module 130 is arranged to receive the input frames 210.1 to 210.n obtained from the image data stream received from the cameras CAM 1 to CAM n and configured to output an output frame 200 showing a surround view perspective synthesized from the input frames 210.1 to 210.n. The surround view perspective comprises overlapping regions which have the origin of partially overlapping fields of view of two adjacent cameras capturing same parts of the physical world environment. The stitching of the overlap regions enables to create the surround view perspective shown in the synthesized output frames 200.

As exemplified above, the overlapping region OL 1-2 is the overlapping region between the field of view of the cameras CAM 1 and CAM 2, the overlapping region OL 2-3 is the overlapping region between the field of view of the cameras CAM 2 and CAM 3, and so on up to the overlapping region OL n−1 between the field of view of the cameras CAM 1 and CAM n.

The predefined calibration data 100 maps the location of each output pixel of the output frame 200 with a corresponding location in at least one of the input frames 210.1 to 210.n. Each output pixel is based on either a single location of one input frame (received from one camera) or, in the overlapping region, two locations each in two different one of two input frames received from two adjacent cameras). The predefined calibration data 100 further associates the locations of output pixels with blending parameters. In particular, the predefined calibration data 100 associates the location of each output pixel in the overlapping regions with a blending parameter. The blending parameter specifies for instance a weight relating to an input frame, in particular a blending parameter specifies a relative weight of the contributions from the input frames to a pixel location in the output frame 200. With the blending operation, the visibility of seams due to transition between adjacent cameras can be eliminated.

The predefined calibration data 100 is provided in memory and accessed by synthesizer module 130 at every frame to synthesize the surround view perspective. For height level adjustment, the predefined calibration data 100 may be accessed by the height level adjustment module 120 every $k^{th}$ input frame, k≥1, in particular k=2, 3, 4, . . . , and therefore, the predefined calibration data 100 may be updated only every $k^{th}$ input frame. In an example, the synthesizer module 130 uses the most recent predefined calibration data 100 from the memory to create the output frame 200.

Thus, in an example, at frame n, the surround view synthesizer module 130 accepts four input frames, the most recent predefined calibration data 100 and outputs an output frame 200 showing a surround view perspective composed of the (time synchronized) input frames 210.1 to 210.n received from the cameras CAM 1 to CAM n.

The predefined calibration data 100 may be organized in form of a look-up table, which associates each location of an output pixel of the output frame 200 with a reference information to one location in one input frame or to two locations each in a different one of two input frames. The predefined calibration data 100 in form of a look-up table further associates each location of an output pixel (in particular each location in an overlapping region) of the output frame 200 with a blending parameter such as an alpha transparency parameter, on the basis of which the values contributed by the two input frames are combined to obtain the corresponding output pixel.

The predefined calibration data 100 is stored in a memory accessible by the surround view synthesizer module 130 applying the predefined calibration data 100 for generating the surround view.

The height level adjustment module 120 runs independently of the surround view synthesizer module 130; in particular, the height level adjustment module 120 may runs asynchronously with the surround view synthesizer module 130. In an example of the present application, the height level adjustment module 120 updates the predefined calibration data 100 every frame. In another example of the present application, the height level adjustment module 120 updates the predefined calibration data 100 at a reduced rate only in comparison to the rate of synthesized output frames 200, in particular every $k^{th}$ frame, k=2, 3, 4, . . . . The height level adjustment module 120 is arranged to receive height levels information HL 1-2, HL 2-3, . . . , HL n−1 each relating to a corresponding one of the overlapping regions of the overlapping regions OL 1-2, OL 2-3, . . . , OL n−1 and to select among height level related calibration data 105 to be used for synthesis of the surround view.

For each overlapping region OL 1-2, . . . , OL n−1 at least a set of set of calibration data records is provided. The sets of set of calibration data records are predefined. The sets of calibration data records are provided in memory for being selected by the height level adjustment module 120. Each data record of a set of predefined calibration data records is associated with one height level.

In response to receiving a height level information HL 1-2, HL 2-3, . . . , or HL n−1 relating to one of the overlapping regions OL 1-2, . . . , OL n−1, the height level adjustment module 120 is configured to update the predefined calibration data 100 with the one or more data records based on the received height level information. The height level adjustment module 120 is configured to accept a height level information HL 1-2, . . . , or HL n−1 for each of the overlapping regions OL 1-2, . . . , OL n−1 and update the predefined calibration data 100 in accordance with received height level information for one or more of the overlapping regions OL 1-2, . . . , OL n−1.

The updating may comprise retrieving of the one or more data records in accordance with the height level information and updating of the predefined calibration data 100 based on the one or more the retrieved data records. The updating may comprise a copying of the data of the one or more data records to a memory region storing the predefined calibration data, where the predefined calibration data is organized in form of a table such as a look-up table, which for instance accepts pixel locations of the output frame 200, e.g. defined in form of coordinates.

The updating may comprise setting a linking information to the one or more data records. The linking information is set in accordance with the height level information to refer to the more data records associated with respective corresponding height levels. The linking information may be a pointer information. The predefined calibration data is organized in form of several data sets comprising the predefined calibration data and the sets of calibration data records. The predefined calibration data records to be used for the synthesis of the surround view are referenced by pointers referring thereto.

The predefined calibration data 100 and the sets 105 of predefined data records are stored in a memory accessible by the surround view synthesizer module 130 applying the predefined calibration data 100 for generating the surround view. The linking information instructs the surround view synthesizer module 130 to use the one or more selected data records. The predefined calibration data 100 may comprise default predefined calibration data records for the overlapping regions OL 1-2, . . . , OL n−1, the default predefined calibration data records relating to the ground level.

Those skilled in the art will further immediately understand that the height level information relating to an overlapping region OL 1-2, . . . , OL 4-1 may comprise height level information relating to the sub-regions thereof. The In response to receiving a height level information HL 1-2, HL 2-3, . . . , or HL n−1 relating to one of the overlapping regions OL 1-2, . . . , OL n−1, the height level adjustment module 120 is configured to update the predefined calibration data 100 with the one or more data sub-records based on the received height level information for the respective sub-regions thereof.

The height level information HL 1-2, HL n−1 received by the height level adjustment module 120 is representative of the respective height levels within each overlapping region OL 1-2, . . . , OL n−1. The height level information HL 1-2, . . . , HL n−1 is representative of the respective height levels within each overlapping region OL 1-2, . . . , OL n−1 to minimize distortion and omission effects in the surround view perspective shown in the output frame 200. In an example, the height level information HL 1-2, . . . , HL n−1 has a spatial resolution and precision adapted to the height levels associated with the set(s) of predefined calibration data records.

The height level adjustment module 120 may store previous height level information HL 1-2, . . . , HL n−1 and compare the stored height level information HL 1-2, . . . , HL n−1 with currently accepted height level information HL 1-2, . . . , HL n−1. The level adjustment module 120 may be hence configured to the predefined calibration data 100 with retrieved data records for overlapping regions OL 1-2, . . . , OL n−1, for which the respective height level information HL 1-2, . . . , or HL n−1 has changed.

The height level information HL 1-2, HL n−1 may be received from one or more sensors or may be derived from sensor inputs such as ultrasonic sensors.

In an example of the present application, ultrasonic sensors may be arranged with each camera CAM 1 to CAM n. Ultrasonic remote sensing technology may be used. Ultrasonic pulses are sent out and the reflected echo is detected by an ultrasonic transducer. Height levels of the reflecting surface can be determined from the runtime of the signal, the emitting angle and the height of the transducer above ground.

In an example of the present application, LIDAR (light detection and ranging), which is an optical remote sensing technology, may be used. An emitter sends out infrared laser pulses and the reflected light is detected by a photodiode. The distance of objects can be determined from the runtime of the signal. Analogously, the height levels of the reflecting surfaces of the objects can be determined.

In an example of the present application, structured light scanning, which is an optical remote sensing technology, may be used. Structured light scanning comprises for instance projecting a narrow band of light onto a three-dimensionally shaped surface to produce a line of illumination. Seen from different viewpoints, the band of light appears distorted and can be used for an exact geometric reconstruction of the surface shape (light section). Alternatively, patterns consisting of many stripes, or of arbitrary fringes, is projected at once. Seen from different viewpoints, the pattern appears geometrically distorted due to the surface shapes of objects. Further variants of structured light projection are possible, patterns of parallel stripes are widely used. The picture shows the geometrical deformation of a single stripe projected onto a simple 3D surface. The displacement of the stripes allows for an exact retrieval of the 3D coordinates of any details on the object's surface. Those skilled in the art understand that such structured light scanning technology is adaptable to the height level resolution and precision requirements for the height level adjustment described in the present application.

The above sensor based technologies allow for providing height level information to the height level adjustment module 120, which comprises one or more representative height levels for the respective overlapping regions.

The sensor outputs are provided to determine the height level information HL 1-2 to HL n−1 for the overlapping regions OL1-2 to OL n−1. The height level information HL 1-2 to HL n−1 comprises one or more height levels representative for respective overlapping region OL 1-2, . . . , OL n−1. The one or more height levels may for instance relate to representative height levels of objects with dimensions extending predefined dimensions. Each height level may relate to a sub-region of the respective overlapping region OL 1-2, OL 2-3, . . . , or OL n−1. The predefined dimensions may be inherent to the used sensors. The height levels may relate to height levels above ground.

Figure 10:
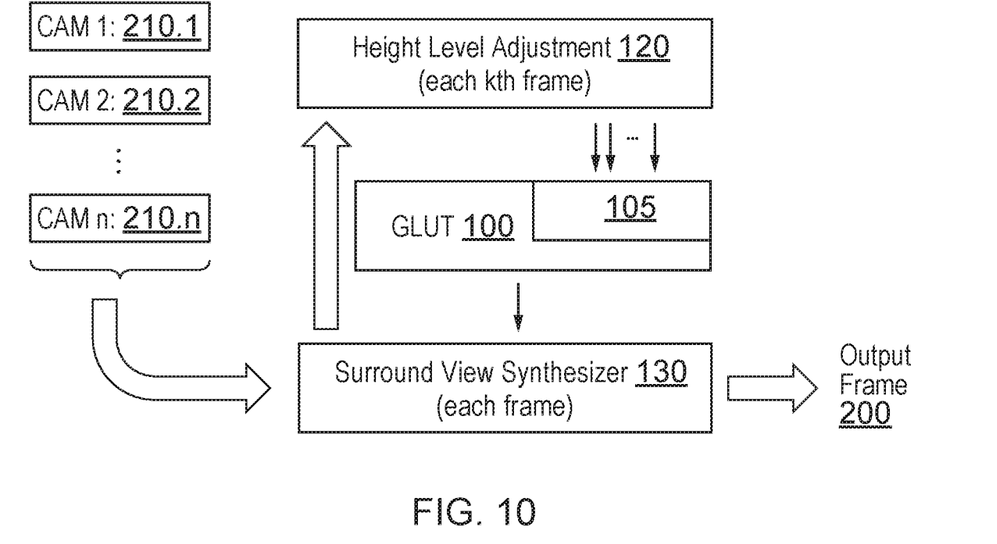

Alternatively or additionally, the height level information HL 1-2, . . . , HL n−1 may be determined from the input frames 210.1 to 210.n. Referring now to FIG. 10, a block diagram of a synthesizer stage according to another example of the present application is schematically illustrated.

The height level adjustment module 120 of FIG. 10 is further configured to determine the height level information from the input frames 210.1 to 210.n. In order to minimize the bandwidth required for transmitting the data of the input frames 210.1 to 210.n, the height level adjustment module

120 may be configured to access the input frames 210.1 to 210.n at the surround view synthesizer module 130.

The height level information HL 1-2, HL n−1 required by the height level adjustment module 120 are determined from frame data of the overlapping regions OL 1-2, . . . , OL n−1. The height level adjustment module 120 is for instance configured to apply a corner detection algorithm on the frame data of the overlapping regions OL 1-2, . . . , OL n−1 to detect common corners in respective two input frames. The height level information for one overlapping region is then for instance determined by applying a triangulation algorithm based on the detected common corners to obtain the desired height level information for the respective overlapping region.

Alternatively or additionally, the height level adjustment module 120 is for instance configured to apply any algorithm for determining depth information from stereo images as known in the art. Such an algorithm for determining depth information from stereo images is performed at a resolution and precision level adapted to the height levels associated with the data records of the set(s) of predefined calibration data records and/or data sub-records of the subset(s) of predefined calibration data sub-records.

For instance, the height level adjustment module 120 is configured to determine a disparity map for each overlapping region. Based on the disparity map a representative height level information is determined for the respective overlapping region.

In an example, the height level adjustment module 120 of FIG. 10 is further configured to determine the height level information from the input frames 210.1 to 210.n for each $k^{th}$ frame (k≥1, in particular k=2, 3, 4, . . . ).

Figure 11:
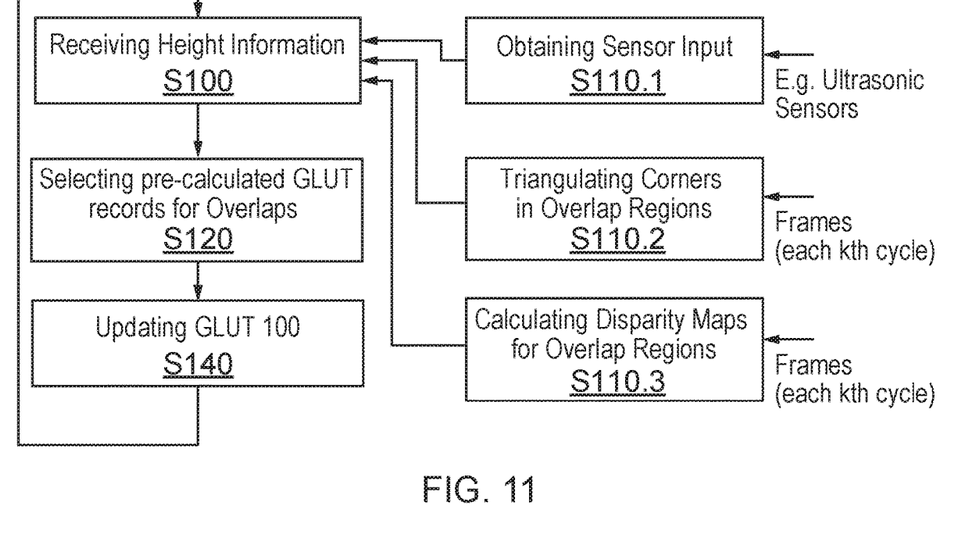
FIG. 11 schematically illustrates a flow diagram of a method for updating predefined calibration data according to an example of the present invention.

Referring now to FIG. 11, a flow diagram relating to the updating of the predefined calibration data is schematically illustrated.

In response to receiving height level information at the height level adjustment module 120 in an operation S100, the height level adjustment module 120 is configured to select a predefined calibration data record for each overlapping region from stored sets of predefined calibration data records in accordance with the received height level information in an operation S120. Each set of predefined calibration data records is provided for one overlapping region. Each data record of one set of predefined calibration data records is associated with a height level. The set of predefined calibration data records may be organized in form of a look-up table, which associated a height level with a respective predefined calibration data record.

The height level information comprises one or more height level information each relating to one of the overlapping regions. The selected predefined calibration data records is received by the height level adjustment module 120 from memory and the height level adjustment module 120 is configured to update the predefined calibration data 100 with the retrieved calibration data records in an operation S140 such that the overlapping regions thereof are adjusted to respective height levels.

The height level adjustment module 120 may buffer height level information previously used for updating the predefined calibration data 100 and the height level adjustment module 120 may retrieve only predefined calibration data records in case the current height level is different from the buffered one.

The height level information may be determined from sensor input obtained in an operation S110.1. Additionally or alternatively, the height level information may be determined by using a triangulating methodology applied on corners detected in input frames with a common overlapping region. Additionally or alternatively, the height level information may be determined by using a depth map known in the field of stereo vision processing applied on corners detected in input frames with a common overlapping region.

In an example, the updating of the predefined calibration data is performed independently from the surround view synthesizing. The updating of the predefined calibration data is for instance performed only in case the change of the height level information is detected. The height level information is for instance provided for each kth input frame cycle (k>1).

Figure 12:
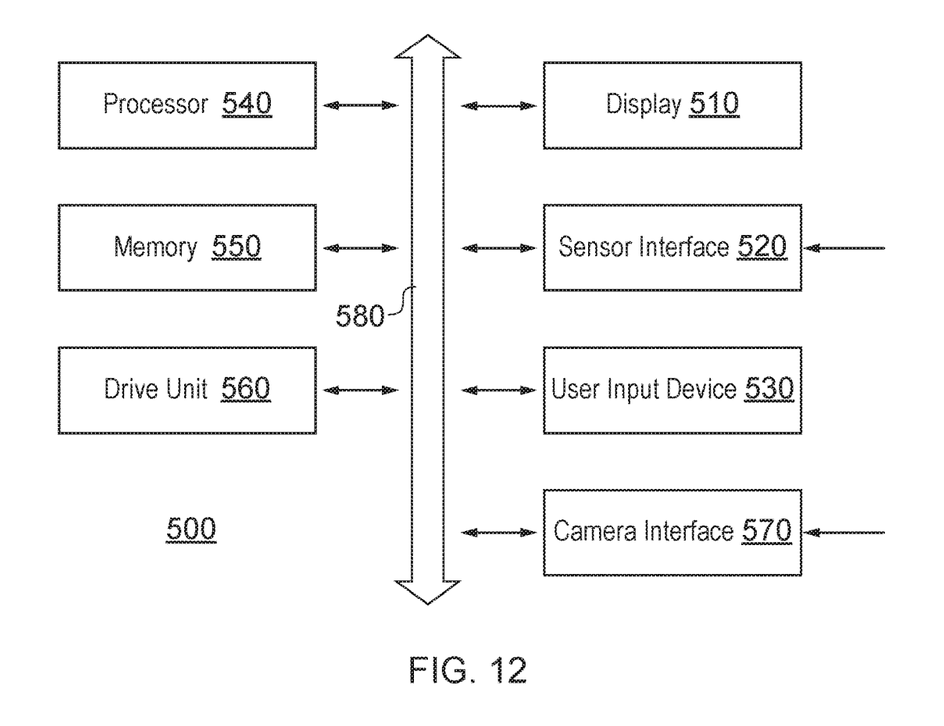
FIG. 12 schematically illustrates a block diagram of a computer system according to an example of the present invention.

Furthermore, the components of the surround view vision system may be or may include a portion or all of one or more computing devices of various kinds, such as the computer system 500 in FIG. 12. The computer system 500 may include a set of instructions that can be executed to cause the computer system 500 to perform any one or more of the methods or computer based functions disclosed.

The computer system 500 can be implemented as or incorporated into various devices, such as various types of vehicle computer systems (e.g., Electronic/Engine Control Module, Powertrain Control Module, Transmission Control Module, Brake Control Module), a personal computer (PC), a tablet PC, a set-top box (STB), a personal digital assistant (PDA), a mobile device, a palmtop computer, a laptop computer, a desktop computer, a communications device, a wireless telephone, a personal trusted device, a web appliance, or any other machine capable of executing a set of instructions (sequential or otherwise) that specify actions to be taken by that machine. The computer system 500 may be implemented using electronic devices that provide voice, audio, video or data communication. While a single computer system 500 is illustrated, the term "system" may include any collection of systems or sub-systems that individually or jointly execute a set, or multiple sets, of instructions to perform one or more computer functions.

The computer system 500 may include a processor 540, such as a central processing unit (CPU), a graphics processing unit (GPU), or both. The processor 540 may be a component in a variety of systems. The processor 540 may be one or more general processors, digital signal processors, application specific integrated circuits, field programmable gate arrays, servers, networks, digital circuits, analog circuits, combinations thereof, or other now known or later developed devices for analyzing and processing data. The processor 540 may have a multi-core processor design. The processor 540 may implement a software program, such as code generated manually or programmed.

The term "module" may be defined to include a number of executable modules. The modules may include software, hardware or some combination thereof executable by a processor, such as processor 540. Software modules may include instructions stored in memory, such as memory 550, or another memory device, that may be executable by the processor 540 or other processor. Hardware modules may include various devices, components, circuits, gates, circuit boards, and the like that are executable, directed, and/or controlled for performance by the processor 540.

The computer system 500 may include a memory, such as a memory 550 that can communicate via a bus 580. The memory 540 may be a main memory, a static memory, or a dynamic memory. The memory 550 may include, but is not limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one example, the memory 550 includes a cache or random access memory for the processor 540. In alternative examples, the memory 550 may be separate from the processor 540, such as a cache memory of a processor, the system memory, or other memory. The memory 550 may include an external storage device or database for storing data. Examples include a hard drive, compact disc ("CD"), digital video disc ("DVD"), memory card, memory stick, floppy disc, universal serial bus ("USB") memory device, or any other device operative to store data. The memory 550 is operable to store instructions executable by the processor 540. The functions, acts or tasks illustrated in the figures or described may be performed by the programmed processor 540 executing the instructions stored in the memory 550. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

A computer readable medium or machine readable medium may include any non-transitory memory device that includes or stores software for use by or in connection with an instruction executable system, apparatus, or device. The machine readable medium may be an electronic, magnetic, optical, electromagnetic, infrared, or semiconductor system, apparatus, or device. Examples may include a portable magnetic or optical disk, a volatile memory such as Random Access Memory "RAM", a read-only memory "ROM", or an Erasable Programmable Read-Only Memory "EPROM" or Flash memory. A machine readable memory may also include a non-transitory tangible medium upon which software is stored. The software may be electronically stored as an image or in another format (such as through an optical scan), then compiled, or interpreted or otherwise processed.

The computer system 500 may or may not further include a display unit 510, such as a liquid crystal display (LCD), an organic light emitting diode (OLED), a flat panel display, a solid state display, a cathode ray tube (CRT), a projector, a printer or other now known or later developed display device for outputting determined information. The display 510 may act as an interface for the user to see the functioning of the processor 540, or specifically as an interface with the software stored in the memory 540 or in the drive unit 560.

The computer system 500 may include an input device 530 configured to allow a user to interact with any of the components of system 500. The input device 530 may be a number pad, a keyboard, or a cursor control device, such as a mouse, or a joystick, touch screen display, remote control or any other device operative to interact with the computer system 500.

The computer system 500 may include a disk or optical drive unit 560. The disk drive unit 560 may include a computer-readable medium in which one or more sets of instructions or software can be embedded. The instructions may embody one or more of the methods or logic described herein, such as synthesized module logic 130 and/or the height level adjustment module 120 of a surround view vision system. The instructions may reside completely, or partially, within the memory 550 and/or within the processor 540 during execution by the computer system 500. The memory 550 and the processor 540 also may include computer-readable media as discussed above.

The computer system 500 may include computer-readable medium that includes instructions responsive to sensor input signals. The sensor input signals may be received via a sensor interface 520, and/or using the bus 580.

The computer system 500 may include a communication port or interface 570 to receive image data from the plurality of cameras of the surround view vision system. The image data may be written frame-wise to the memory 550 via the bus 580.

The term "computer-readable medium" may include a single medium or multiple media, such as a centralized or distributed database, and/or associated caches and servers that store one or more sets of instructions. The term "computer-readable medium" may also include any medium that is capable of storing, encoding or carrying a set of instructions for execution by a processor or that cause a computer system to perform any one or more of the methods or operations disclosed. The "computer-readable medium" may be non-transitory, and may be tangible.

The computer-readable medium may include a solid-state memory such as a memory card or other package that houses one or more non-volatile read-only memories. The computer-readable medium may be a random access memory or other volatile re-writable memory. The computer-readable medium may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. The computer system 500 may include any one or more of a computer-readable medium or a distribution medium and other equivalents and successor media, in which data or instructions may be stored.

In alternative examples, dedicated hardware implementations, such as application specific integrated circuits, programmable logic arrays and other hardware devices, may be constructed to implement various parts of the system. Applications that may include the apparatus and systems can broadly include a variety of electronic and computer systems. One or more examples described may implement functions using two or more specific interconnected hardware modules or devices with related control and data signals that can be communicated between and through the modules, or as portions of an application-specific integrated circuit. The computer system 500 encompasses software, firmware, and hardware implementations.

The system described may be implemented by software programs executable by a computer system. Implementations can include distributed processing, component/object distributed processing, and parallel processing. Alternatively, virtual computer system processing can be constructed to implement various parts of the system.

According to an example of the present application, a method of adjusting predefined calibration data for generating a perspective view is provided. The perspective view comprises for instance a surround view imaging at least partially the surrounding environment of an object such as a vehicle. An output frame 200 imaging the perspective view is synthesized from input frames 210.1 to 210.$n$ in accordance with predefined calibration data 100. Each input frame 210.1 to 210.4 originates from a different one of a plurality of cameras CAM 1 to CAM 4. The plurality of cameras comprises two adjacent cameras. The input frames 210.1 to 210.$n$ of the two adjacent cameras have an overlapping region OL 1-2 to OL 4-1, which images an overlapping field of view captured by the two adjacent cameras.

The predefined calibration data 100 is adjusted with the help of a set 101 to 104 of predefined calibration data records, each of which relating to a different height level. Height level information HL 1-2 to HL 4-1 is received, which is representative of a height level in the overlapping region OL 1-2 to OL 4-1. For adjusting the predefined calibration data, a data record out of the set 101 to 104 of predefined calibration data records is selected in accordance with the height level information HL 1-2 to HL 4-1 and the predefined calibration data 100 is updated with the selected data record. The updating comprises in particular setting a reference to the selected data record.

According to an example of the present application, each data record of the set of predefined calibration data records comprises a number of predefined calibration data sub-records forming a set of predefined calibration data sub-records. Each sub-record relates to a sub-region of the overlapping region OL 1-2 to OL 4-1. The plurality of sub-regions, the number of which corresponds to the number of predefined calibration data sub-records, forms a connected area corresponding to the overlapping region OL 1-2 to OL 4-1. The height level information is representative of height levels of the sub-regions of the overlapping region OL 1-2 to OL 4-1. For adjusting the predefined calibration data 100, a data sub-record is selected out of the set of predefined calibration data sub-records for each sub-region in accordance with the height level information and the predefined calibration data 100 is updated with the selected data sub-records.

According to an example of the present application, the input frames 210.1 to 210.$n$ have a plurality of overlapping regions OL 1-2 to OL 4-1. Each overlapping region OL 1-2 to OL 4-1 images an overlapping field of view captured by two adjacent cameras CAM 1 to CAM 4. A set 101 to 104 of predefined calibration data records is provided for every overlapping region OL 1-2 to OL 4-1 and the received height level information HL 1-2 to HL 4-1 is representative of several height levels each relating to one of the overlapping regions OL 1-2 to OL 4-1. For adjusting the predefined calibration data 100, data records are selected out of the respective set 101 to 104 of predefined calibration data records in accordance with the height level information, wherein each selected data record relates to a different one of the plurality of overlapping regions OL 1-2 to OL 4-1; and the predefined calibration data 100 is updated with the selected data records.

According to an example of the present application, the adjusting of the predefined calibration data is performed independently of the synthesizing of the output frame 200 of the perspective view According to an example of the present application, each two adjacent cameras of the plurality of cameras CAM 1 to CAM 4 capture an overlapping field of view, which is imaged in an overlapping region OL 1-2 to OL 4-1 of the respective two different input frames 210.1 to 210.4.

According to an example of the present application, the synthesizing further comprises stitching the overlapping region OL 1-2 to OL 4-1.

According to an example of the present application, the predefined calibration data 100 geometrical alignment data and further optical correction data and/or blending parameters. The blending parameters in particular comprises alpha transparency parameters for the overlapping region OL 1-2 to OL 4-1.

According to an example of the present application, the input frames 210.1 to 210.4 are provided synchronized in time for synthesizing.

According to an example of the present application, a system for generating a perspective view is provided.

The perspective view is synthesized in an output frame 200 by a synthesizer module 130 from input frames 210.1 to 210.$n$ in accordance with predefined calibration data 100. The perspective view comprises for instance a surround view imaging at least partially the surrounding environment of an object such as a vehicle. An output frame 200 imaging the perspective view is synthesized from input frames 210.1 to 210.$n$ in accordance with predefined calibration data 100. Each input frame 210.1 to 210.4 originates from a different one of a plurality of cameras CAM 1 to CAM 4. The plurality of cameras comprises two adjacent cameras. The input frames 210.1 to 210.$n$ of the two adjacent cameras have an overlapping region OL 1-2 to OL 4-1, which images an overlapping field of view captured by the two adjacent cameras. The predefined calibration data 100 is adjusted with the help of a set 101 to 104 of predefined calibration data records provided at the system. Each data record of the set 101 to 104 of predefined calibration data records relates to a different height level. An adjustment module 120 of the system is configured to receive height level information HL 1-2 to HL 4-1, which is representative of a height level in the overlapping region OL 1-2 to OL 4-1. The adjustment module 120 of the system is further configured to select a data record out of the set 101 to 104 of predefined calibration data records in accordance with the height level information HL 1-2 to HL 4-1; and to update the predefined calibration data 100 with the selected data record.

According to an example of the present application, each data record of the set of predefined calibration data records comprises a number of predefined calibration data sub-records forming a set of predefined calibration data sub-records. Each sub-record relates to a sub-region of the overlapping region OL 1-2 to OL 4-1. The plurality of sub-regions, the number of which corresponds to the number of predefined calibration data sub-records, forms a connected area corresponding to the overlapping region OL 1-2 to OL 4-1. The height level information is representative of height levels of the sub-regions of the overlapping region OL 1-2 to OL 4-1. The adjustment module 120 of the system is further configured to select a data sub-record out of the set of predefined calibration data sub-records for each sub-region in accordance with the height level information and to update the predefined calibration data 100 with the selected data sub-records.

According to an example of the present application, the input frames 210.1 to 210.$n$ have a plurality of overlapping regions OL 1-2 to OL 4-1. Each overlapping region OL 1-2 to OL 4-1 images an overlapping field of view captured by two adjacent cameras CAM 1 to CAM 4. A set 101 to 104 of predefined calibration data records is provided for every overlapping region OL 1-2 to OL 4-1 and the received height level information HL 1-2 to HL 4-1 is representative of several height levels each relating to one of the overlapping regions OL 1-2 to OL 4-1. The adjustment module 120 of the system is further configured to select data records out of the respective set 101 to 104 of predefined calibration data records in accordance with the height level information; and the predefined calibration data 100 is updated with the selected data records. Each selected data record relates to a different one of the plurality of overlapping regions OL 1-2 to OL 4-1.

According to an example of the present application, the predefined calibration data 100 maps each pixel location of the output frame 200 to a location in at least one of the input frames 210.1 to 210.4 thereby creating the perspective view in the output frame 200.

According to an example of the present application, the height level information HL 1-2 to HL 4-1 is determined on the basis of sensor outputs or on the basis of an analysis of the images in the overlapping regions of the input frames.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To illustrate clearly this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

The invention claimed is:

1. A method of adjusting predefined calibration data for generating a perspective view,
wherein the perspective view is synthesized in an output frame from input frames in accordance with the predefined calibration data, wherein each input frame originates from one of a plurality of cameras comprising two adjacent cameras, the input frames of which have an overlapping region imaging an overlapping field of view captured by the two adjacent cameras,
wherein the method comprises:
in a computer processing system:
providing a set of predefined calibration data records each of which relating to a different height level of a surface at an elevated level in a corresponding reference environment;
receiving height level information representative of a height level of a surface in the overlapping region in images taken by the two adjacent cameras,
selecting a data record out of the set of predefined calibration data records in accordance with the height level of the surface in the overlapping region;
updating the predefined calibration data with the selected data record; and
generating display images using the input frames and the updated predefined calibration data.

2. The method according to claim 1,
wherein each data record of the set of predefined calibration data records comprises a predefined number of predefined calibration data sub-records, each of which relates to a sub-region of the overlapping region,
wherein the height level information is representative of height levels of the sub-regions of the overlapping region;
wherein the adjusting of the predefined calibration data further comprises:
selecting a data sub-record out of the predefined number of predefined calibration data sub-records for each sub-region in accordance with the height level information; and
updating the predefined calibration data with the selected data sub-records.

3. The method according to claim 1,
wherein the input frames have a plurality of overlapping regions, each of which images an overlapping field of view captured by two adjacent cameras,
wherein the adjusting of the predefined calibration data further comprises:
providing a set of predefined calibration data records for each overlapping region;
receiving height level information representative of several height levels each relating to one of the overlapping regions;
selecting data records out of the respective set of predefined calibration data records in accordance with the height level information, wherein each selected data record relates to a different one of the overlapping regions; and
updating the predefined calibration data with the selected data records.

4. The method according to claim 1,
wherein the adjusting of the predefined calibration data is performed independently of the synthesizing of the output frame.

5. The method according to claim 1,
wherein each two adjacent cameras of the plurality of cameras capture an overlapping field of view, which is imaged in an overlapping region of the respective two different input frames.

6. The method according to claim 1,
wherein the synthesizing further comprises stitching the overlapping region.

7. The method according to claim 1, further comprising:
providing the predefined calibration data, which maps each pixel location of the output frame to a location in at least one of the input frames.

8. The method according to claim 1,
wherein the predefined calibration data includes optical correction data and/or blending parameters.

9. The method according to claim 1, further comprising:
providing the input frames synchronized in time for synthesizing.

10. The method according to claim 1, further comprising:
displaying the display images on a display device.

11. A system for adjusting predefined calibration data for generating a perspective view,
wherein the perspective view is synthesized in an output frame by a synthesizer module from input frames in accordance with predefined calibration data,
wherein each input frame originates from a different one of a plurality of cameras comprising two adjacent cameras, the input frames of which have an overlapping region imaging an overlapping field of view captured by the two adjacent cameras,
a set of predefined calibration data records each of which relating to a different height level of a surface in a reference environment,
wherein the system comprises an adjustment module configured to receive height level information representative of a height level of a surface in the overlapping region in images taken by the two adjacent cameras;
to select a data record out of the set of predefined calibration data records in accordance with the height level information; and
to update the predefined calibration data with the selected data record.

12. The system according to claim 11,
wherein each data record of the set of predefined calibration data records comprises a predefined number of predefined calibration data sub-records, each of which relates to a sub-region of the overlapping region,
wherein the height level information is representative of height levels of the sub-regions of the overlapping region,
wherein the adjustment module is further configured
to select a data sub-record out of the predefined number of predefined calibration data sub-records for each sub-region in accordance with the height level information; and
to update the predefined calibration data with the selected data sub-records.

13. The system according to claim 11,
wherein the input frames have a plurality of overlapping regions, each of which images an overlapping field of view captured by two adjacent cameras,
wherein the system comprises a set of predefined calibration data records for each overlapping region,
wherein the adjustment module is further configured
to receive height level information representative of one or more height levels each relating to one of the overlapping regions;
to select one or more data records out of the one or more respective sets of predefined calibration data records in accordance with the height level information; and
to update the predefined calibration data with the one or more selected data records,
wherein each of the one or more selected data records relates to a different one of the overlapping regions.

14. The system according to claim 11, further comprising:
wherein the predefined calibration data maps each pixel location of the output frame to a location in at least one of the input frames.

15. The system according to claim 11, further comprising:
wherein the height level information is determined on the basis of sensor outputs or on the basis of an analysis of the images in the overlapping regions of the input frames.

16. A non-transitory storage medium comprising computer executable instructions, which, when executing on one or more processing devices, cause the one or more processing devices to perform a method of generating a perspective view according to claim 1.

* * * * *